(12) United States Patent
Ma et al.

(10) Patent No.: US 12,081,010 B2
(45) Date of Patent: Sep. 3, 2024

(54) SUBSTATION FRAME

(71) Applicant: JIANGSU SHEMAR ELECTRIC CO., LTD., Nantong (CN)

(72) Inventors: Bin Ma, Nantong (CN); Aoyun Zhuang, Nantong (CN)

(73) Assignee: JIANGSU SHEMAR ELECTRIC CO., LTD., Nantong (CN)

( * ) Notice: Subject to any disclaimer, the term of this patent is extended or adjusted under 35 U.S.C. 154(b) by 385 days.

(21) Appl. No.: 17/612,516

(22) PCT Filed: Aug. 6, 2021

(86) PCT No.: PCT/CN2021/111272
§ 371 (c)(1),
(2) Date: Nov. 18, 2021

(87) PCT Pub. No.: WO2022/042263
PCT Pub. Date: Mar. 3, 2022

(65) Prior Publication Data
US 2023/0089437 A1    Mar. 23, 2023

(30) Foreign Application Priority Data

Aug. 31, 2020  (CN) .......................... 202010897246.9

(51) Int. Cl.
*H02G 7/20* (2006.01)
*E04H 12/08* (2006.01)
*H01B 17/10* (2006.01)
*H02B 5/00* (2006.01)
*H02G 7/05* (2006.01)

(52) U.S. Cl.
CPC ............... *H02G 7/20* (2013.01); *E04H 12/08* (2013.01); *H01B 17/10* (2013.01); *H02B 5/00* (2013.01); *H02G 7/05* (2013.01)

(58) Field of Classification Search
CPC . H02G 7/20; H02G 7/05; E04H 12/08; E04H 5/04; H01B 17/10; H02B 5/00; H02B 5/01
See application file for complete search history.

(56) References Cited

U.S. PATENT DOCUMENTS 9,698,585 B2    7/2017  Ma et al.

FOREIGN PATENT DOCUMENTS

| CN | 202090629 U | 12/2011 |
| CN | 104295147 A | 1/2015 |

(Continued)

OTHER PUBLICATIONS

CN 105239817 A (Translation) (Year: 2023).*
(Continued)

*Primary Examiner* — Hoa C Nguyen
*Assistant Examiner* — John B Freal
(74) *Attorney, Agent, or Firm* — Taft Stettinius & Hollister LLP

(57) ABSTRACT

The present disclosure discloses a substation frame comprising: a supporting assembly comprising at least two supporting posts arranged at intervals, the at least two supporting posts comprising one side supporting post at each end; a beam assembly comprising a beam provided between every two adjacent supporting posts; and a side wire attaching assembly provided on at least one side supporting post and positioned on a side of the side supporting post facing away from the beam.

20 Claims, 6 Drawing Sheets

(56) References Cited

FOREIGN PATENT DOCUMENTS

| CN | 104481178 | A | | 4/2015 |
|---|---|---|---|---|
| CN | 105239817 | A | * | 1/2016 |
| CN | 205489247 | U | | 8/2016 |
| CN | 205955303 | U | | 2/2017 |
| CN | 109301740 | A | | 2/2019 |
| CN | 110159051 | A | | 8/2019 |
| CN | 112081427 | A | | 12/2020 |
| CN | 212359263 | U | | 1/2021 |
| JP | H08242511 | A | | 9/1996 |
| JP | 2001003601 | A | | 9/2001 |

OTHER PUBLICATIONS

International Search Report for Application No. PCT/CN2021/111272 dated Sep. 28, 2021, 4 pages.
European Search Report for corresponding Application No. 21798926.8 dated Jul. 22, 2022, 9 pages.

* cited by examiner

SUBSTATION FRAME

CROSS REFERENCE TO RELATED APPLICATIONS

This is a U.S. National Stage application of, and claims priority to, PCT/CN2021/111272, filed Aug. 6, 2021, which further claims priority to Chinese Patent Application No. 202010897246.9, filed Aug. 31, 2020, the disclosures of which are each incorporated herein by reference in its entirety.

TECHNICAL FIELD

The present disclosure relates to the technical field of substation equipment, and more particularly to a substation frame.

BACKGROUND

Due to the use of sulfur hexafluoride ($SF_6$) gas as a main insulating medium, gas insulated substation (GIS) can greatly reduce an electrical safe distance between wires and effectively reduce the land occupation of the entire substation compared to conventional open-type substations. However, in a practical engineering of the GIS, a mature and cost-effective substation frame design scheme is still required, which can further reduce the land occupation, reduce the material consumption and achieve the effect of saving the construction cost.

SUMMARY

The present disclosure provides a substation frame, to address the technical problems of large material consumption, large land occupation and high cost of the substation frame.

In order to solve the above technical problems, a technical solution adopted in the present disclosure is to provide a substation frame comprising: a supporting assembly comprising at least two supporting posts arranged at intervals, the at least two supporting posts comprising one side supporting post at each end; a beam assembly comprising a beam provided between every two adjacent supporting posts; and a side wire attaching assembly provided on at least one side supporting post and positioned on a side of the side supporting post facing away from the beam.

According to an embodiment of the present disclosure, the side wire attaching assembly comprises a post cross arm. One end of the post cross arm is connected to the side supporting post. The post cross arm extends out in a direction facing away from the beam. The other end of the post cross arm is configured to attach a wire.

According to an embodiment of the present disclosure, the side wire attaching assembly further comprises a suspension member having one end connected to the side supporting post and the other end connected to the other end of the post cross arm.

According to an embodiment of the present disclosure, both the post cross arm and the suspension member are made of insulating materials, and the wire can be directly attached to the other end of the post cross arm.

According to an embodiment of the present disclosure, the side wire attaching assembly further comprises a first tension insulator connected to the other end of the post cross arm. The wire is attached to the side wire attaching assembly through the first tension insulator.

According to an embodiment of the present disclosure, two supporting posts are provided. One of the supporting posts is provided with three wire attaching points, the other of the supporting posts is provided with two wire attaching points. The beam is provided with one wire attaching point.

According to an embodiment of the present disclosure, the beam is made of composite insulating material, and a position on the beam between two supporting posts can be directly configured as a wire attaching point.

According to an embodiment of the present disclosure, at least one of the supporting posts comprises a first supporting part and a second supporting part that are connected to each other. The first supporting part is located between the beam and the second supporting part. The first supporting part is made of composite insulating material. The second supporting part is made of metal material. A connection between the first supporting part and the beam assembly can be directly configured as a wire attaching point.

According to an embodiment of the present disclosure, the substation frame further comprises a first supporting insulator connected to the supporting post. A free end of the first supporting insulator is configured for supporting a wire attached to the wire attaching point at the connection between the first supporting part and the beam.

According to an embodiment of the present disclosure, the first supporting part can be directly provided with wire attaching points. A distance between two adjacent wire attaching points is greater than a first predetermined value; or, the substation frame further comprises a second tension insulator provided on the supporting post. A free end of the second tension insulator is configured as a wire attaching point.

According to an embodiment of the present disclosure, the substation frame further comprises a second beam provided between two adjacent supporting posts, and located below the beam; and a third tension insulator connected to the second beam. A free end of the third tension insulator is configured as a wire attaching point.

According to an embodiment of the present disclosure, one of the side supporting posts is made of metal material. A lightning rod is provided at a top of the side supporting post made of metal material; or one of the intermediate supporting posts is made of metal material. A lightning rod is provided at a top of the supporting post made of metal material.

According to an embodiment of the present disclosure, the side supporting post made of metal material is provided with a fourth tension insulator. A free end of the fourth tension insulator can be configured as a wire attaching point.

According to an embodiment of the present disclosure, all the supporting posts include a first supporting part and a second supporting part that are connected to each other. The first supporting part is located between the beam and the second supporting part. The first supporting part is made of composite insulating material, the second supporting part is made of metal material. The substation frame comprises a lightning rod provided on the beam assembly. The lightning rod is connected to the second supporting part via a jumper to be grounded.

According to an embodiment of the present disclosure, the substation frame comprises a second supporting insulator provided on the beam assembly. One end of the second supporting insulator away from the beam assembly is configured to provide a ground wire. The ground wire is connected to the lightning rod for grounding.

According to an embodiment of the present disclosure, all the supporting posts comprise a first supporting part and a second supporting part that are connected to each other. The first supporting part is located between the beam and the second supporting part. The first supporting part is made of composite insulating material. The second supporting part is made of metal material. The substation frame comprises a third supporting insulator provided on the beam assembly. One end of the third supporting insulator away from the beam assembly is configured to attach a ground wire. The ground wire is directly grounded through a down lead, or is connected to the second supporting part through the down lead and thus is grounded.

An advantageous effect of the present disclosure is that, the side wire attaching assembly is provided on the side of the side supporting post facing away from the beam, and one wire can be further provided on the side wire attaching assembly, so that the number of the wires that are connected can be expanded, the use of the beams and the supporting posts can be reduced, the consumption amount of steel and basic materials can be reduced, and the construction cost can be reduced. In addition, the beam and the first supporting part are made of composite material, so that the structure of the substation frame is more compact, and the land occupation of the substation frame is reduced. Furthermore, by replacing the conventional insulating material with the composite insulating material, the maintenance-free can be achieved, and operation and maintenance costs are saved.

BRIEF DESCRIPTION OF THE DRAWINGS

In order to illustrate the technical solutions in the present disclosure more clearly, the following will briefly introduce the drawings used in the description of the embodiments. Obviously, the drawings in the following description are merely several embodiments of the present disclosure. For those ordinary skilled in the art, other drawings can be obtained based on these drawings without creative work, in which.

DETAILED DESCRIPTION OF THE EMBODIMENTS

The technical solutions in the embodiments of the present disclosure will be described clearly and completely hereinafter with reference to the accompanying drawings in the embodiments of the present disclosure. Apparently, the described embodiments are merely a part of, but not all embodiments of the present disclosure. All other embodiments obtained by a person of ordinary skill in the art based on the embodiments of the present disclosure without creative effort are fallen within the scope of the present disclosure.

Figure 1:
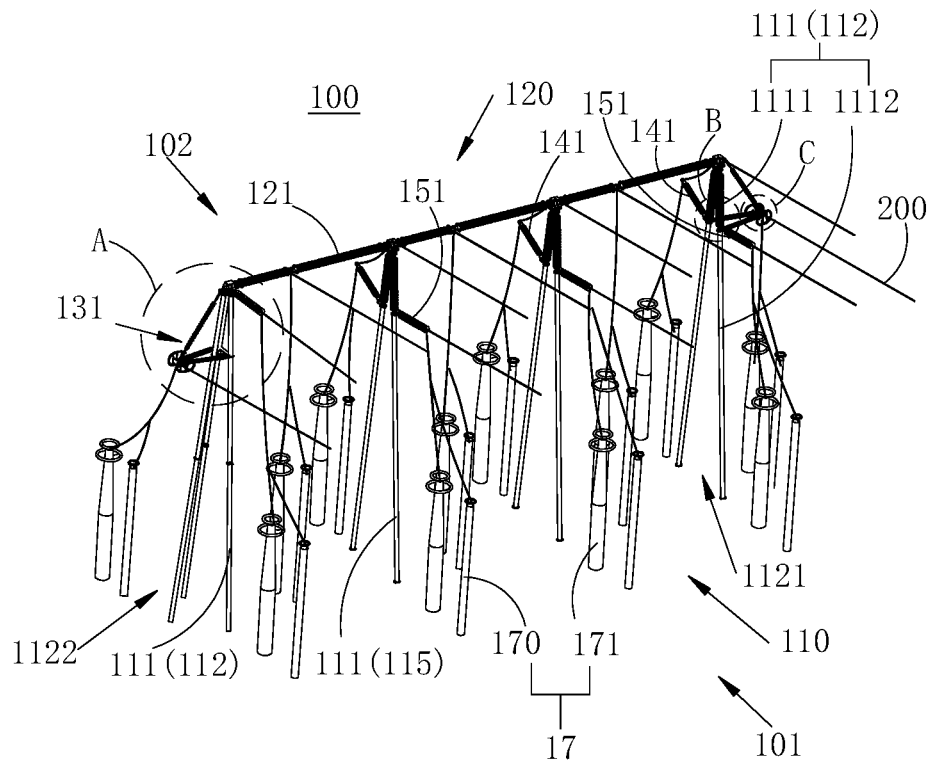
FIG. 1 is a schematic perspective view of a substation frame according to an embodiment of the present disclosure.

An embodiment of the present disclosure discloses a substation frame 100 comprising a supporting assembly 110, a beam assembly 120, and a side wire attaching assembly 131, as shown in FIG. 1. The supporting assembly 110 comprises at least two supporting posts 111 arranged at intervals. The at least two supporting posts 111 comprises one side supporting post 112 at each end. The two side supporting posts 112 are a first side supporting post 1121 and a second side supporting post 1122, respectively. The beam assembly 120 comprises a beam 121 provided between every two adjacent supporting posts 111. The side wire attaching assembly 131 is provided at least on the first side supporting post 1121 and positioned on a side of the first side supporting post 1121 facing away from the beam 121. By providing the side wire attaching assembly 131 on the side of the first side supporting post 1121 facing away from the beam 121, and one wire 200 can be further provided on the substation frame 100, such that the number of the wires 200 that are connected can be expanded, the use of the beams 121 and the supporting posts 111 can be reduced, the consumption amount of steel and basic materials can be reduced, and the construction cost can be reduced.

Preferably, each of the first side supporting post 1121 and the second side supporting post 1122 is provided with the side wire attaching assembly 131, so that the number of the wires 200 that are connected can be further expanded, the use of the beams 121 and the supporting posts 111 can be reduced, the consumption amount of steel and basic materials can be reduced, and the construction cost can be reduced.

Figure 2:
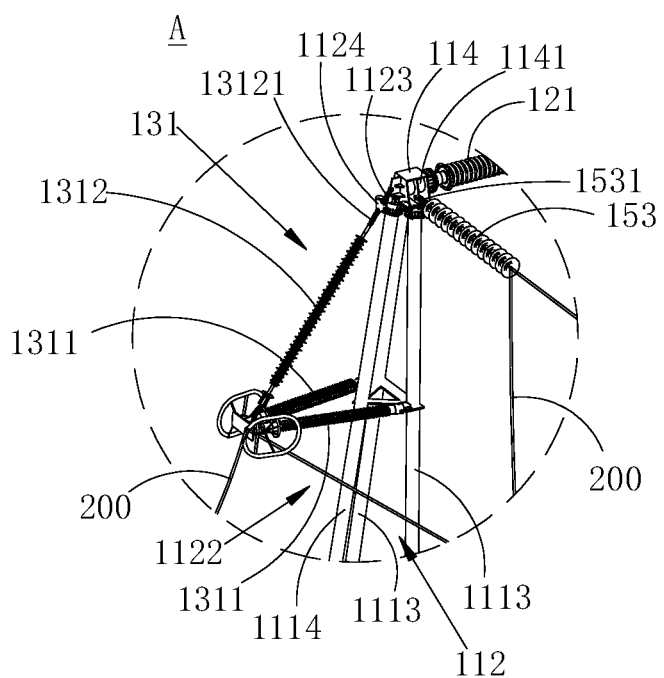
FIG. 2 is an enlarged schematic view of a part A in FIG. 1.
Figure 3:
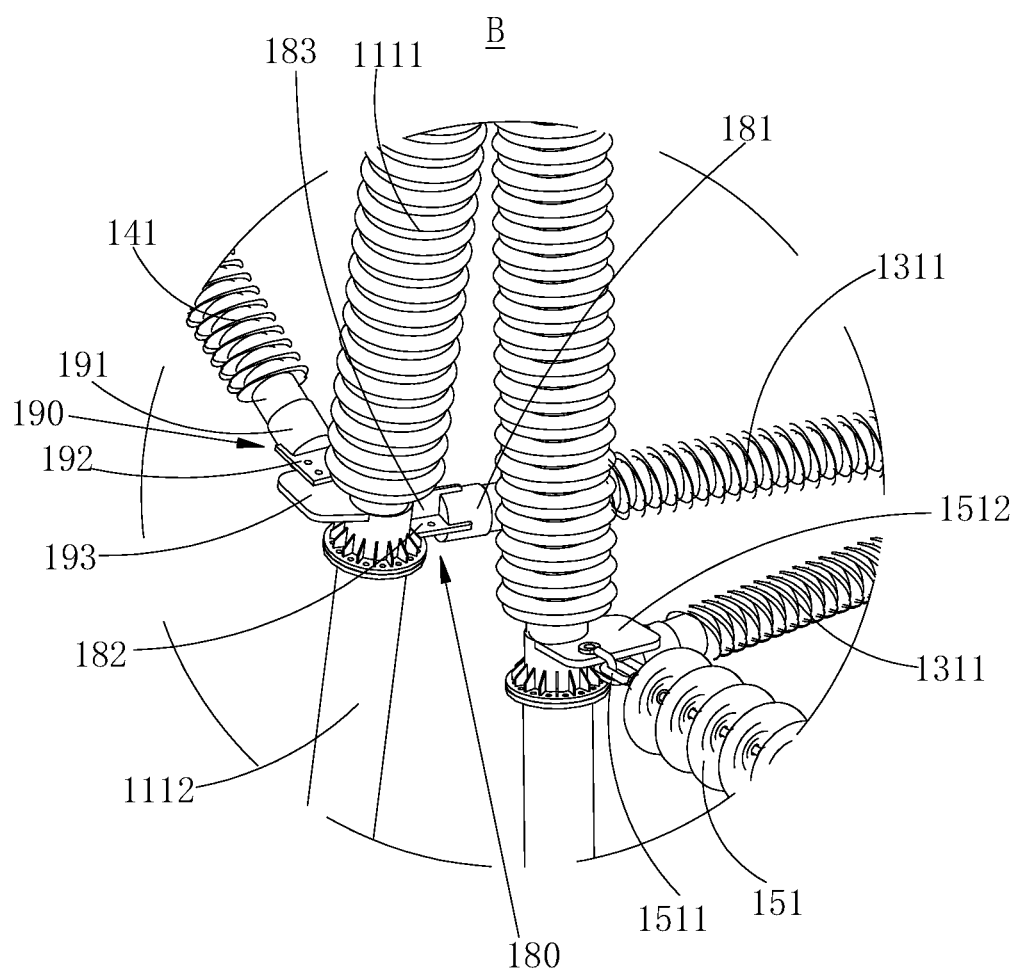
FIG. 3 is an enlarged schematic view of a part B in FIG. 1.

In an embodiment, as shown in FIG. 2, the side wire attaching assembly 131 comprises a post cross arm 1311. One end of the post cross arm 1311 is connected to the side supporting post 112, and the post cross arm 1311 extends out in a direction facing away from the beam 121. The other end of the post cross arm 1311 is used to attach the wire 200. Specifically, as shown in FIGS. 1 and 3, two ends of the post cross arm 1311 are each connected with a first end fitting 180. The first end fittings 180 comprises a first sleeve 181, a first plate 182, and a first reinforcing rib 183. The first sleeve 181 is sleeved and fixed to one end of the post cross arm 1311. A U-shaped groove matching one end of the first sleeve 181 is formed at one end of the first plate 182. The first plate 182 is engaged and fixed to the end of the first sleeve 181 through the U-shaped groove. The first plate 182 may be fixed to the first sleeve 181 by welding, or the first plate 182 may be integrally formed with the first sleeve 181, which is not limited herein. The first reinforcing rib 183 is located in a space formed by a surface of the first plate 182 and an end surface of the first sleeve 181. One side of the first reinforcing rib 183 is fixedly disposed on the surface of the first plate 182, the other side thereof is fixedly disposed on the end surface of the first sleeve 181. The first reinforcing rib 183 may be perpendicular to the surface of the first plate 182 and the end surface of the first sleeve 181 simultaneously. The first reinforcing rib 183 increase a strength of the connection between the first plate 182 and the first sleeve 181, to avoid bending or separation of the connection under extreme weather conditions. Specifically, the first reinforcing rib 183 may be fixed to the first plate 182 and the first sleeve 181 by welding. In other embodiments, the first reinforcing rib 183 may also be integrally formed with the first plate 182, which is not limited herein. A first end fitting 180 at one end of the post cross arm 1311 is connected to the side supporting post 112 by a fastener.

As shown in FIGS. 1 and 2, in order to enhance a strength of the side wire attaching assembly 131, the side wire attaching assembly 131 further comprises a suspension member 1312 having one end connected to the side supporting post 112 and the other end connected to the other end of the post cross arm 1311, thereby improving a stability of the side wire attaching assembly 131. One end of the suspension member 1312 may be connected to the side supporting post 112 or to the connection between the side supporting post 112 and the beam 121.

Specifically, as shown in FIG. 2, one end of the suspension member 1312 is connected with a first right-angled attaching ring group 13121, and the side supporting post 112 is connected with a second right-angled attaching ring group 1123. The first right-angled attaching ring group 13121 and the second right-angled attaching ring group 1123 are respectively connected to a first connecting plate 1124, so that one end of the suspension member 1312 is connected to the side supporting post 112.

Figure 4:
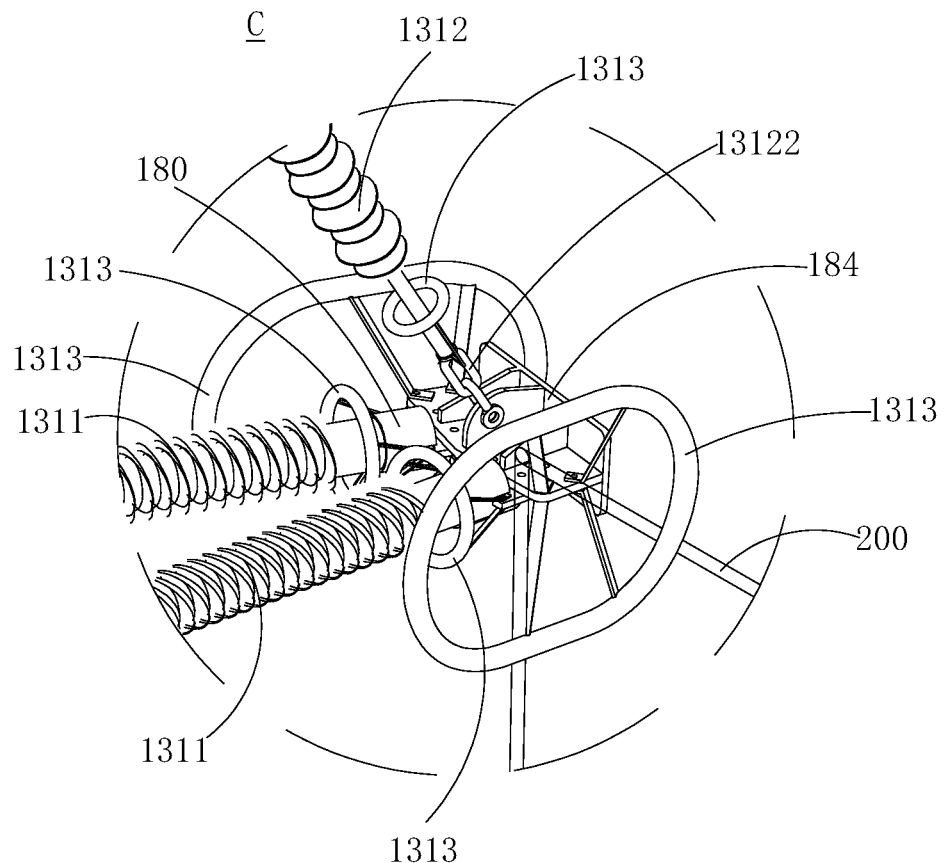
FIG. 4 is an enlarged schematic view of a part C in FIG. 1.

As shown in FIG. 4, the other end of the suspension member 1312 is connected with a third right-angled attaching ring group 13122, and the first end fitting 180 at the other end of the suspension member 1311 and the third right-angled attaching ring group 13122 are respectively connected to a second connecting plate 184, so that the other end of the suspension member 1312 and the post cross arm 1311 are connected to each other.

Further, as shown in FIG. 4, the post cross arm 1311 and the suspension member 1312 are both made of insulating materials, and the wire 200 can be directly attached to the other end of the post cross arm 1311 through a wire attaching fitting. Since the connection between the post cross arm 1311 and the suspension member 1312 is used to attach the wire, the other end of the post cross arm 1311 and the other end of the suspension member 1312 are both provided with a grading ring 1313. The grading ring 1313 can evenly distribute the high voltage to ensure that there is no potential difference between various parts of the ring, thereby achieving the effect of equalizing the voltage and preventing abnormal discharge from occurring. In addition, since the connecting ends of the post cross arm 1311 and the suspension member 1312 have uneven surfaces, grading rings 1313 are provided on both sides of the second connecting plate 184. The grading rings 1313 are located on both sides of the connecting point of the wire 200, thereby achieving an effect of equalizing the voltage and preventing abnormal discharge from occurring.

In a specific embodiment, each supporting post comprises a main supporting post. The main supporting post is connected with a post cross arm extending out in a direction facing away from the beam. One end of the suspension member is connected to a connection between the side supporting post and the beam, and the other end thereof is connected to one end of the post cross arm. The suspension member forms a stable triangular space with the post cross arm and the main supporting post. The other end of the post cross arm is used to attach the wire.

In a further specific embodiment, as shown in FIGS. 1 and 2, each supporting post 111 comprises two main supporting posts 1113. Each main supporting post 1113 is connected with one post cross arm 1311. The post cross arm 13 11 extends out in a direction facing away from the beam 121. The other ends of the two post cross arms 1311 are connected to each other. One end of the suspension member 1312 is connected to the connection between the side supporting posts 112 and the beam 121, the other end thereof is connected to the connection end of the two post cross arms 1311. The suspension member 1312 forms a stable triangular pyramid space with the two post cross arms 1311 and the two main supporting posts 1113, and the connection end of the two post cross arms 1311 are used to attach the wire 200. Preferably, the two post cross arms 1311 are located in the same horizontal plane.

Further, as shown in FIG. 2, a straight line on which an axis of the beam 121 is located is perpendicular to a plane in which the axes of the two main supporting posts 1113 are located, and an angle of 5°-70° is formed between the two main supporting posts 1113. The two main supporting posts 1113 are connected to the beam 121 via a flange assembly 114. Of the two side supporting posts 112 located on both sides, at least one side supporting post 112 further comprises an oblique supporting post 1114 connected with the flange assembly 114. The oblique supporting post 114 is located outside the plane where the two main supporting posts 1113 are located, so as to limit an offset of the substation frame 100 in the extension direction of the beam 121. In this embodiment, the second side supporting post 1122 comprises an oblique supporting post 1114 connected with the flange assembly 114. It should be noted that the oblique supporting post 1114 is provided on a side away from the beam assembly 120, and the oblique supporting post 1114 is located between the two post cross arms 1311. In other embodiments, it is also possible that the first side supporting post comprises an oblique supporting post, or that both the first side supporting post and the second side supporting post comprise an oblique supporting post, in order to further limit the offset of the substation frame in the extension direction of the beam, which are not specifically limited herein.

In other embodiments, the side wire attaching assembly further comprises a first tension insulator connected to the other end of the post cross arm, and the wire is attached to the side wire attaching assembly through the first tension insulator. In this case, both the post cross arm and the suspension member may be made of metal materials to save costs.

In an embodiment, as shown in FIG. 1, the beam 121 is made of composite insulating material. A position on the beam 121 between two supporting posts 111 can be directly used as a wire attaching point. In the conventional substation frame, the beam is made of metal material, and a combination of a tension insulator string, a suspension insulator string, or a jumper is required to attach the wires. In an embodiment, the beam 121 is made of composite insulating material, and thus having excellent electrical insulating performance and can be used to directly attach the wires 200 without using a structure such as a suspension insulator, thereby reducing the consumption amount of material used by the structure such as the suspension insulator. Further, since the tension insulator string, the suspension insulator string, and the jumper are saved, it is possible to eliminate a problem of windage yaw discharge in the substation frame 100. The substation frame 100 made of the composite insulating material has advantages of light in weight, not susceptible to rusting and cracking, high efficiency in transportation and installation, no maintenance in the whole life cycle, and reduced operation and maintenance cost compared to the original ceramic insulator string. Of course, in other embodiments, the beam may be made of metal material, and a combination of a tension insulator string, a suspension insulator string, or a jumper is required to attach the wires.

Figure 5:
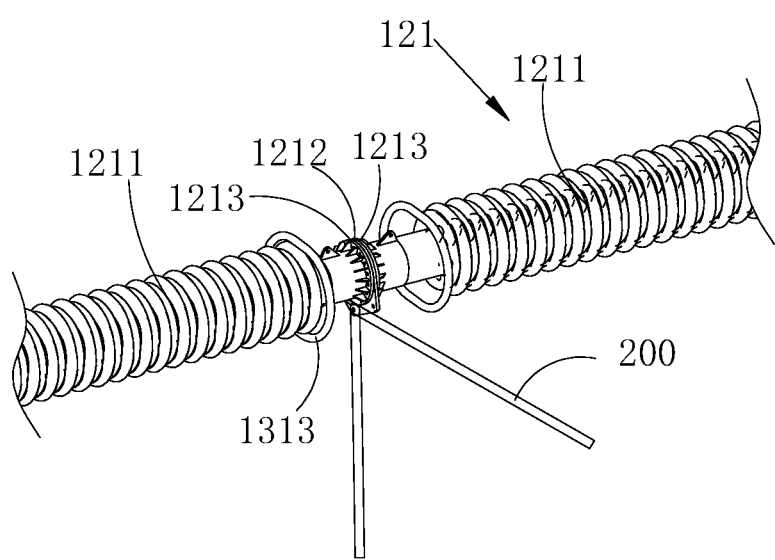
FIG. 5 is a schematic view showing a partial structure of a substation frame according to an embodiment of the present disclosure, which is used to show a beam.

In an embodiment, as shown in FIG. 5, the beam 121 comprises at least two beam segments 1211, such as two, three, or more beam segments 1211. Two adjacent beam segments 1211 are connected by flanges. The substation frame 100 comprises a first attachment plate 1212 disposed at the flanges between two adjacent beam segments 1211. The first attachment plate 1212 is provided with a plurality of wire attaching holes for connecting wire attaching fittings (not shown in figures) and then attaching the wires 200. The wire is connected to the wire attaching fitting, such that the wire is attached to the wire attaching hole. That is, the first attachment plate 1212 is formed with a wire attaching point. Specifically, the beam 121 comprises two beam segments 1211. Adjacent ends of the two beam segments 1211 are respectively connected to a first flange 1213. The first attachment plate 1212 is sandwiched between two first flanges 1213 for attaching the wire 200. Of course, in other embodiments, the beam may be an integrated long beam. A plurality of hoops can be provided on the beam at intervals. An attachment plate can be provided on the hoops to form a plurality of wire attaching points for attaching the wires. The first flange 1213 is further provided with a grading ring 1313 on both sides. The grading rings 1313 can evenly distribute the high voltage around to ensure that there is no potential difference between various parts of the ring, thereby achieving the effect of equalizing the voltage and preventing abnormal discharge from occurring.

In an embodiment, as shown in FIGS. 1 and 2, the beam 121 is gradually raised upward in a direction away from the supporting posts 111 on both sides to form an arched beam 121, so that the substation frame 100 can counteract vertical sag with its own arched structure, thus reducing safety hazards. Specifically, a flange assembly 114 is provided between the supporting post 111 and the beam 121. An end of the supporting post 111 and an end of the beam 121 are respectively connected to the flange assembly 114. The flange assembly 114 comprises a cylindrical body 1141. The cylindrical body 1141 has an axis inclined upward and forms an acute angle with the horizontal plane, thereby ensuring that the cylindrical body 1141 can have a tendency to pre-arch upward after being mounted. When the flange assembly 114 is connected to the beam 121, a linkage pre-arch angle can be generated so that the beam 121 can be gradually raised upward in the direction away from the supporting posts 111 on both sides to form the arched beam 121.

Further, as shown in FIG. 1, the at least one of the supporting posts 111 comprises a first supporting part 1111 and a second supporting part 1112 that are connected to each other. The first supporting part 1111 is located between the beam 121 and the second supporting part 1112. The first supporting part 1111 is made of composite insulating material, and the second supporting part 1112 is made of metal material. A connection between the first supporting part 1111 and the beam assembly 120 may be directly used as a wire attaching point. Of course, in other embodiments, the first supporting part 1111 and the second supporting part 1112 may be provided with wire attaching points, which are not specifically limited herein. Since the first supporting part 1111 connected to the beam 121 is made of composite insulating material, the first supporting part 1111 has excellent electrical insulation performance, thereby reducing the electrical safe distance between the wires 200 and the supporting post 111, and in turn effectively reducing the width of the substation frame 100 and the cost of land occupation. Further, the second supporting part 1112 is made of metal material, thereby achieving an effect of reducing the cost. In addition, the supporting post 111 of the above-described composite structure is light in weight, not susceptible to rusting and cracking, and accordingly, which solves the problem of difficulty in transportation, installation and maintenance, and reduces the cost of transportation and installation.

In order to further reduce the width of the substation frame 100, all the supporting posts 111 comprise the first supporting part 1111 and the second supporting part 1112. Each of the first supporting part 1111 is made of composite insulating material, so as to fully develop its electrical insulation performance, thereby minimizing the electrical safe distance between the wire 200 and the supporting post 111, thereby reducing the width of the substation frame and the cost of land occupation.

It should be noted that the beam 121 and the first supporting part 1111 may employ a post insulator structure. The post insulator comprises an insulating body located therein and a rubber shed covering an outside of the insulating body. Specifically, the insulating body may be an insulating tube or an insulating core rod. The insulating tube may be a glass steel tube formed by winding and curing glass fiber or aramid fiber impregnated with epoxy resin or a hollow pultruded tube by pultrusion. The insulating core rod may be a solid core rod formed by winding and curing glass fiber or aramid fiber impregnated with epoxy resin or a pultruded core rod formed by pultrusion. The rubber shed may be made of high-temperature vulcanized silicone rubber, or may be made of other forms of rubber material. The insulating body is provided with flanges at both ends. The flanges at both ends of the beam assembly 121 are fixedly connected to two flange assemblies 114 (as described below) at both ends of the substation frame 100, respectively. The flanges at both ends of the first supporting part 1111 are respectively fixedly connected to the flange assembly 114 and the second supporting part 1112, which may be connected by other connecting members, or may be fixed by welding, or may be connected in a combination thereof. In other embodiments, the beam 121 and the first supporting part 1111 may also be made of other composite insulating materials, which is not limited herein.

As shown in FIG. 1, in order to ensure the electrical insulation distance between the wire 200, attached to the wire attaching point at the connection between the beam 121 and the first supporting part 1111, and the second supporting part 1112, the substation frame 100 further comprises a first supporting insulator 141. The first supporting insulator 141 comprises a first end connected to the supporting post 111 and a second end opposite to the first end. The second end is a free end. A free end of the first supporting insulator 141 is used for supporting the wire 200 attached to the wire attaching point at the connection between the first supporting part 1111 and the beam 121. Preferably, the first supporting insulator 141 is disposed horizontally, or the free end of the first supporting insulator 141 is higher than the first end of the first supporting insulator 141.

Specifically, as shown in FIGS. 1 and 3, the end of the first supporting insulator 141 connected to the supporting post 112 is provided with a second end fitting 190. The second end fitting 190 comprises a second sleeve 191 and a second plate 192. The second sleeve 191 is sleeved and fixed to an end of the first supporting insulator 141, and a U-shaped groove matching the end of the second sleeve 191 is formed at one end of the second plate 192. The second plate 192 is engaged and fixed to the end of the second sleeve 191 through the U-shaped groove. The second plate 192 may be fixed to the second sleeve 191 by welding, or the second plate 192 may be integrally formed with the second sleeve 191, which is not limited herein. The second end fitting 190 at one end of the first supporting insulator 141 connected with the supporting post 111 is connected to the supporting post 111 by a fastener.

Further, as shown in FIG. 3, since the second supporting part 1112 made of metal material has higher strength and bearing force than the first supporting part 1111 made of composite insulating material, the first supporting insulator 141 may be connected to the connection between the first supporting part 1111 and the second supporting part 1112. The connection between the first supporting part 1111 and the second supporting part 1112 is provided with a third connecting plate 193. The second end fitting 190 is connected to the third connecting plate 193 by a fastener. Thus, the height and strength of the second supporting part 1112 can be fully utilized, also it is convenient for the first supporting insulator 141 to be connected to the supporting post 111.

As shown in FIG. 1, the substation frame 100 further comprises a second tension insulator 151. One end of the second tension insulator 151 is disposed on the supporting post 111, and the other end thereof is a free end. The free end of the second tension insulator 151 can be used as a wire attaching point. In an embodiment, since the first supporting part 1111 is made of composite insulating material, the second supporting part 1112 is made of metal material, the second supporting part 1112 made of metal material has higher strength and bearing capacity than the first supporting part 1111 made of composite insulating material, the second tension insulator 151 may be connected to the connection between the first supporting part 1111 and the second supporting part 1112. Thus, the height and strength of the second supporting part 1112 can be fully utilized, and it is convenient for the second tension insulator 151 to be connected to the supporting post 111. Preferably, the second tension insulator 151 is horizontally connected to the supporting post 111.

Specifically, as shown in FIG. 3, one end of the second tension insulator 151 is connected with a fourth right-angled attaching ring group 1511. A fourth connecting plate 1512 is provided at the connection between the first supporting part 1111 and the second supporting part 1112. The fourth right-angled attaching ring group 1511 is connected to the fourth connecting plate 1512.

In other embodiments, the second tension insulator may be provided on the second supporting part or the first supporting part.

Of course, if a length of the first supporting part 1111 is long, the first supporting part 1111 may be directly provided with wire attaching points, and only a distance between adjacent wire attaching points is required to be greater than a first predetermined value. That is, an electrical insulation distance is satisfied. The distance between the wire attaching point and the second supporting part 1112 is also required to satisfy the electrical insulation distance.

Figure 7:
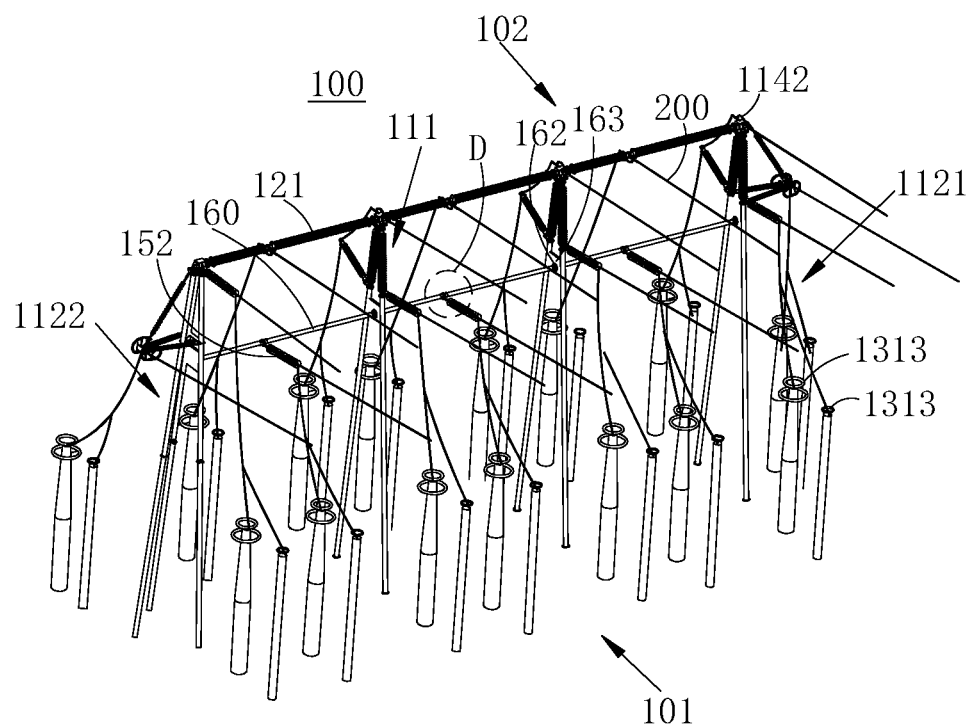
FIG. 7 is a schematic perspective view of a substation frame according to another embodiment of the present disclosure.

In yet another embodiment, as shown in FIG. 7, the substation frame 100 further comprises a second beam 160. The second beam 160 is provided between two adjacent supporting posts 111. The second beam 160 is positioned below the beam 121. The second beam 160 is made of metal material. The substation frame 100 further comprises a third tension insulator 152. One end of the third tension insulator 152 is connected to the second beam 160, the other end thereof is a free end. The free end of the third tension insulator 152 is used as a wire attaching point. Therefore, under the condition that the length of the beam 121 remains unchanged, one wire 200 can be further provided between two adjacent supporting posts 111, so that the number of the wires 200 that are connected can be expanded, the use of the beam 121 and the supporting posts 111 can be reduced, the consumption amount of steel and basic materials can be reduced, and the construction cost can be reduced. In addition, it is possible to make full use of the space, compress the lateral space of the substation frame 100, and achieve the purpose of reducing the land occupation of the substation. Preferably, the third tension insulator 152 is horizontally connected to the second beam 160.

Figure 8:
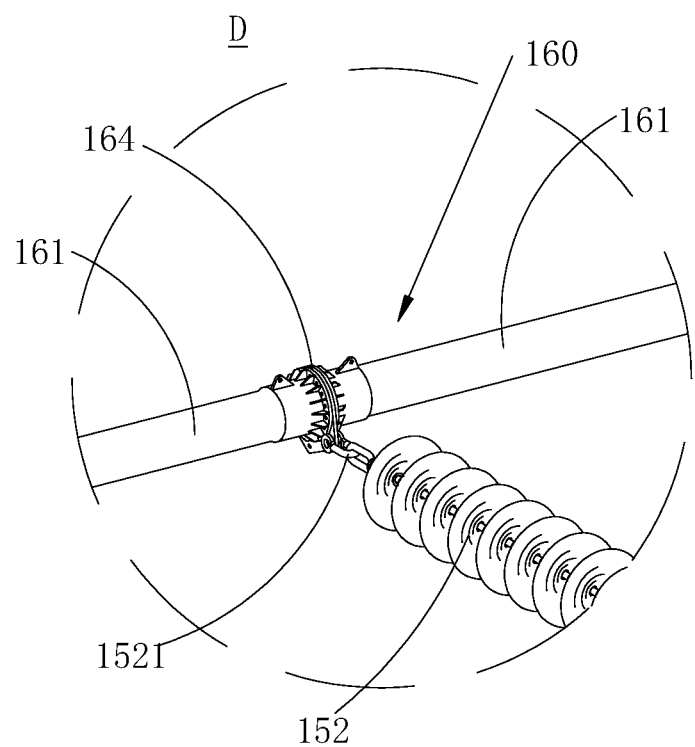
FIG. 8 is an enlarged schematic view of a part D in FIG. 7.

In an embodiment, as shown in FIGS. 7 and 8, two ends of the second beam 160 are each connected to a second flange 162. A fixing plate 163 is provided on the supporting post 111. The second flange 162 is fixed to the fixing plate 163 by a fastener. In this embodiment, the second beam 160 comprises at least two sub-beams 161, such as two, three, or more sub-beams 161. Two adjacent sub-beams 161 are connected by flanges. The substation frame 100 comprises a second attachment plate 164. The second attachment plate 164 is disposed at the flanges between two adjacent sub-beams 161. The second attachment plate 164 is provided with a reserved hole for connecting the third tension insulator 152. Specifically, one end of the third tension insulator 152 is connected to a fifth right-angled attaching ring group 1521, and the fifth right-angled attaching ring group 1521 is connected to the reserved hole at the second attachment plate 164. In other embodiments, the second beam may comprise only one sub-beam. Two ends of the sub-beam are respectively connected to two adjacent supporting posts. A hoop is provided at a middle position of the sub-beam. The hoop is provided with an integrally formed attachment plate.

In an embodiment, as shown in FIG. 1, the second side supporting post 1122 is made of metal material, and a lightning rod (not shown in figures) is provided at the top of the second side supporting post 1122, so that the lightning rod is grounded through the second side supporting post 1122. In addition, the lightning rod can be supported by the supporting post 111 made of the metal material. Thus, the steel material can be saved and the cost can be reduced, compared to the case where the lightning rod is provided on the ground independently.

Further, as shown in FIGS. 1 and 2, one end of a fourth tension insulator 153 is provided on the second side supporting post 1122, the other end thereof is a free end. The free end of the fourth tension insulator 153 can be used as a wire attaching point. Specifically, the fourth tension insulator 153 may be connected to the connection between the second side supporting post 1122 and the beam 121, or the fourth tension insulator 153 may be directly connected to the second side supporting post 1112. Preferably, the fourth tension insulator 153 is horizontally connected to the second side supporting post 1112.

Specifically, as shown in FIG. 2, one end of the fourth tension insulator 153 is connected with a sixth right-angled attaching ring group 1531. The sixth right-angled attaching ring group 1531 is connected to the flange assembly 114.

In another embodiment, one of the intermediate supporting posts located between the two side supporting posts is made of metal material. A lightning rod is provided at the top of the intermediate supporting post made of the metal material, so that the lightning rod is directly grounded through the intermediate supporting post. In addition, the lightning rod can be supported by the intermediate supporting post made of the metal material. Thus, the steel material can be saved and the cost can be reduced, compared to the case where the lightning rod is provided on the ground independently.

Specifically, since one of the intermediate supporting posts is made of metal material and the lightning rod is provided at the top, only one wire attaching point may be provided on the intermediate supporting post, and the two side supporting posts on both sides may each comprise the first supporting part made of composite insulating material, so that each of the two side supporting posts may be provided with three wire attaching points.

In yet another embodiment, all the supporting posts comprise the first supporting part and the second supporting part that are connected to each other. The first supporting part is located between the beam and the second supporting part. The first supporting part is made of composite insulating material, and the second supporting part is made of metal material. The lightning rod can be provided on the beam assembly or at the top of any supporting post, and the lightning rod can be connected to the second supporting part via a jumper, so as to be grounded.

When the lightning rod is disposed on the substation frame 100 and grounded, the substation frame 100 may further comprise a second supporting insulator (not shown in figures) provided on the beam assembly 120. One end of the second supporting insulator away from the beam assembly 120 is used to provide a ground wire. The ground wire is connected to the lightning rod for grounding.

It should be noted that if all the supporting posts comprise the first supporting part and the second supporting part that are connected to each other, the first supporting part is located between the beam and the second supporting part, the first supporting part is made of composite insulating material, the second supporting part is made of metal material, then, the substation frame may further comprise a third supporting insulator provided on the beam assembly. One end of the third supporting insulator away from the beam assembly is configured to provide a ground wire. The ground wire is directly grounded through a down lead or is connected to the second supporting part through the down lead and thus is grounded.

Figure 6:
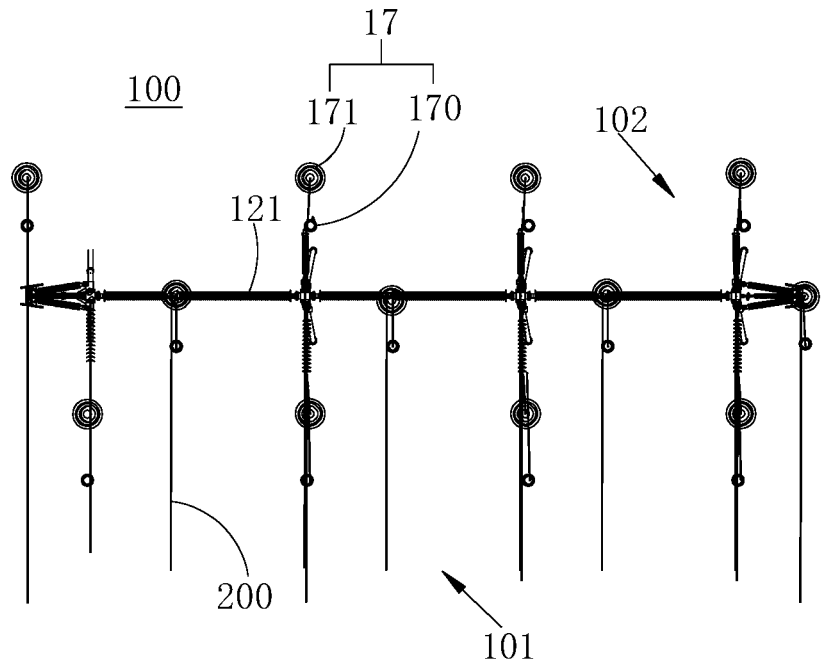
FIG. 6 is a schematic top view of a substation frame according to an embodiment of the present disclosure.

In the conventional substation frame, the wires are arranged in order in a lateral direction, resulting in larger land occupation in the lateral direction. In an embodiment, as shown in FIGS. 1 and 6, a single-layer substation frame 100 can achieve a double-layer wiring. That is, the beam 121 and the supporting post 111 can each be provided with the wire attaching point. The wire attaching points provided at the beam 121 and provided at the connection between the beam 121 and the supporting post 111 are located at an upper layer, and the wire attaching points provided on the supporting post 111 are located at the lower layer. For the gas insulated substation, a ground equipment 17 is further comprised. Each of the wire 200 corresponds to a set of ground equipment 17. The ground equipment 17 is provided below the substation frame 100 or provided on the ground around the substation frame 100. The ground equipment 17 comprises gas insulated transmission tubes 170. The gas insulated transmission tubes 170 are disposed below the substation frame 100 and correspond to the wire attaching points in one-to-one correspondence, so as to receive the wires 200 attached to the corresponding wire attaching points. Specifically, the wire attaching points of three-phase wires 200 in the same circuit of the ground equipment are arranged in a triangular arrangement, and the gas insulated transmission tubes 170 are arranged in a triangle, so that the wires 200 are directly connected from the substation frame 100, and are connected to the ground equipment 17 below or around the substation frame 100, thereby making full use of the space, compressing the lateral space of the substation frame 100, and reducing the land occupation of the substation.

As shown in FIGS. 1 and 6, the two sides of the substation frame 100 are divided into a first side 101 and a second side 102 along a plane where the axis of the beam assembly 120 and the axis of the supporting assembly 110 are located. The wires 200 are led from the first side 101 into a corresponding ground equipment 17 through the substation frame 100. Specifically, the wires 200 are led from the first side 101 to the substation frame 100, or the wires 200 are led out from the substation frame 100 to the first side 101.

As shown in FIG. 1, each of the first side supporting post 1121 and the second side supporting post 1122 is provided with the side wire attaching assembly 131. Each of the two side wire attaching assemblies 131 is located on a side of the corresponding side supporting post 112 facing away from the beam 121. As shown in FIGS. 1 and 2, the second side supporting post 1122 is made of metal material. The second side supporting post 1122 is provided with two wire attaching points, one of which is located on the side wire attaching assembly 131. The ground equipment 17 corresponding to this wire attaching point is located on the side of the second side supporting post 1122 facing away from the beam 121. Alternatively, the ground equipment 17 corresponding to the wire attaching point is located on the second side 102. The ground equipment 17 corresponding to the wire 200 attached to the wire attaching point on the side wire attaching assembly 131 is disposed on the side of the second side supporting post 1122 facing away from the beam 121.

The fourth tension insulator 153 is provided on the second side supporting post 1122. The free end of the fourth tension insulator 153 may be used as another wire attaching point. The ground equipment 17 corresponding to this wire attaching point is located on the first side 101. Preferably, a line from the wire attaching point to the second side supporting post 1122 is perpendicular to the beam 121. The wire 200 attached to the free end of the fourth tension insulator 153 is located on the first side 101.

As shown in FIG. 1, the first side supporting post 1121 comprises a first supporting part 1111 made of composite insulating material and a second supporting part 1112 made of metal material. The first side supporting post 1121 is provided with three wire attaching points. A first wire attaching point is located on the side wire attaching assembly 131. The ground equipment 17 corresponding to this wire attaching point is located on the side of the side supporting post 112 facing away from the beam 121. The ground equipment 17 corresponding to the wire 200 attached to the wire attaching point on the side wire attaching assembly 131 is respectively disposed on the side of the first side supporting post 1121 facing away from the beam 121.

As shown in FIG. 1, a second wire attaching point is disposed at the connection between the first side supporting post 1121 and the beam 121. The first supporting insulator 141 is connected to the first side supporting post 1121 and is located on the second side 102. The free end of the first supporting insulator 141 is used to support the wire 200 attached to the wire attaching point at the connection between the first supporting part 1111 and the beam 121. The ground equipment 17 corresponding to the second wire attaching point is located on the second side 102. Preferably, a line from the wire attaching point to the first side supporting post 1121 is perpendicular to the beam 121. Referring FIG. 7, the wire 200 is connected from the first side 101 to the flange assembly 114 at the connection between the first supporting part 1111 and the beam 121, and connected to the free end of the first supporting insulator 141 on the second side 102 via the flange assembly 114. The connection points of the wires 200 connected to the flange assembly 114 and located on the first side 101 and the second side 102 are communicated with each other through a jumper assembly 1142.

As shown in FIG. 1, a third wire attaching point is disposed at the free end of the second tension insulator 151. The second tension insulator 151 may be connected to the connection between the first supporting part 1111 and the second supporting part 1112. The second tension insulator 151 is located on the first side 101. The ground equipment 17 corresponding to the third wire attaching point is located on the first side 101. Preferably, a line from this wire attaching point to the first side supporting post 1121 is perpendicular to the beam 121. The wire 200 attached to the free end of the second tension insulator 151 is located on the first side 101.

Further, as shown in FIGS. 1 and 2, the first side supporting post 1121 comprises two main supporting posts 1113. The two main supporting posts 1113 are respectively located on the first side 101 and the second side 102. The first supporting insulator 141 is connected to the main supporting post 1113 located on the second side 102, and the second tension insulator 151 is connected to the main supporting post 1113 located on the first side 101.

The intermediate supporting post 115 comprises the first supporting part 1111 made of composite insulating material and the second supporting part 1112 made of metal material. Two wire attaching points are provided on the intermediate supporting post 115. A first wire attaching point is disposed at the connection between the intermediate supporting post 115 and the beam 121. The first supporting insulator 141 is connected to the intermediate supporting post 115 and is located on the second side 102. The free end of the first supporting insulator 141 is used to support the wire 200 attached to the wire attaching point at the connection between the first supporting part 1111 and the beam 121. The ground equipment 17 corresponding to the first wire attaching point is located on the second side 102. Preferably, a line from this wire attaching point to the intermediate supporting post 115 is perpendicular to the beam 121. The wire 200 is connected from the first side 101 to the flange assembly 114 at the connection between the first supporting part 1111 and the beam 121, and connected to the free end of the first supporting insulator 141 of the second side 102 via the flange assembly 114. The connection points of the wires 200 on the flange assembly 114 located on the first side 101 and the second side 102 are communicated with each other through a jumper assembly.

As shown in FIG. 1, a second wire attaching point on the intermediate supporting post 115 is disposed at the free end of the second tension insulator 151. The second tension insulator 151 may be connected to the connection between the first supporting part 1111 and the second supporting part 1112. The second tension insulator 151 is located on the first side 101. The ground equipment 17 corresponding to the second wire attaching point is located on the first side 101. Preferably, a line from this wire attaching point to the intermediate supporting post 115 is perpendicular to the beam 121.

Further, the intermediate supporting post 115 comprises two main supporting posts 1113. The two main supporting posts 1113 are respectively located on the first side 101 and the second side 102. The first supporting insulator 141 is connected to the main supporting post 1113 located on the second side 102, and the second tension insulator 151 is connected to the main supporting post 1113 located on the first side 101.

In an embodiment, as shown in FIG. 1, a position on the beam 121 between two supporting posts 111 can be directly used as the wire attaching point. The ground equipment 17 corresponding to this wire attaching point is located below the beam 121. The ground equipment 17 corresponding to the wire 200 attached to the wire attaching point on the beam 121 between two supporting posts 111 is provided at or around a projection of the wire attaching point on the ground.

In a further embodiment, as shown in FIGS. 1 and 7, the substation frame 100 further comprises the second beam 160 and the third tension insulator 152. One end of the third tension insulator 152 is connected to the second beam 160, the other end of the third tension insulator 152 is a free end. The free end of the third tension insulator 152 is configured as a wire attaching point. The ground equipment 17 corresponding to this wire attaching point is located on the first side 101. The wire 200 attached to the free end of the third tension insulator 152 is located on the first side 101.

In addition, the ground equipment 17 corresponding to the wire 200 attached to a position on the beam 121 between two supporting posts 111 is located on the second side 102. Preferably, a line from the wire attaching point of the third tension insulator 152 to the ground equipment 17 corresponding to this wire attaching point is perpendicular to the beam 121.

The ground equipment 17 further comprises a lightning arrester 171. The lightning arrester 171 is disposed below the substation frame 100 or on the ground around the substation frame 100. The lightning arresters 171 are disposed in a one-to-one correspondence with the gas insulated transmission tubes 170. Each lightning arrester 171 is electrically connected to the wire 200 of the gas insulated transmission tube 170 corresponding thereto, to release the energy of overvoltage.

The lightning arrester 171 and the gas insulated transmission tube 170 are provided with the grading ring 1313. The grading rings 1313 can evenly distribute the high voltage around, to ensure that there is no potential difference between various parts of the ring, thereby achieving the effect of equalizing the voltage.

In a specific embodiment, the substation frame 100 is a double-circuit structure with a total of six wire attaching points.

Figure 9:
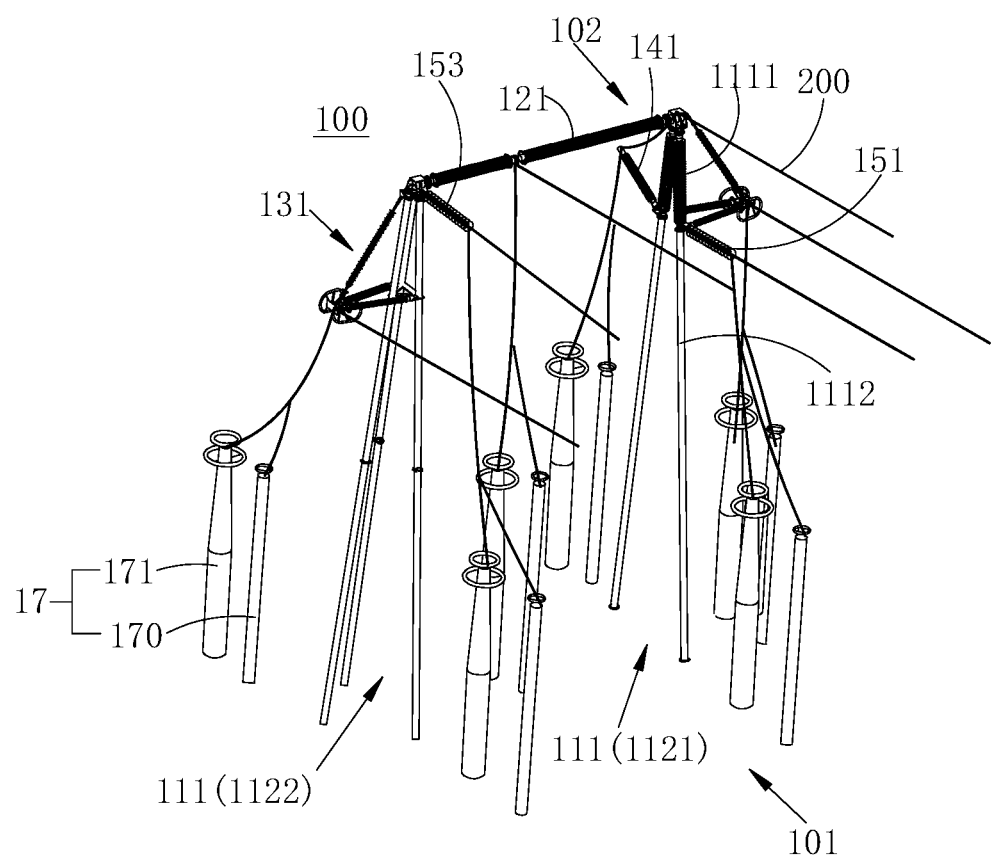
FIG. 9 is a schematic perspective view of a substation frame according to yet another embodiment of the present disclosure.

Specifically, as shown in FIG. 9, the substation frame 100 may comprise two supporting posts 111, i.e., the first side supporting post 1121 and the second side supporting post 1122 as described above. The first side supporting post 1121 is provided with three wire attaching points, and the second side supporting post 1122 is provided with two wire attaching points. The beam 121 as described above is provided between the first side supporting post 1121 and the second side supporting post 1122. A position on the beam 121 between the first side supporting post 1121 and the second side supporting post 1122 is provided with one wire attaching point.

Alternatively, the substation frame 100 may comprise two supporting posts 111, i.e., the second side supporting post 1122 and the intermediate supporting post 115 as described above. The second side supporting post 1122 and the intermediate supporting post 115 are respectively provided with two wire attaching points. The beam 121 and the second beam 160 as described above are provided between the second side supporting post 1122 and the intermediate supporting post 115. A position on the beam 121 between the second side supporting post 1122 and the intermediate supporting post 115 is provided with one wire attaching point. The second beam 160 is provided with one wire attaching point by providing the third tension insulator 152.

In a specific embodiment, the substation frame 100 is a four-circuit structure with a total of twelve wire attaching points.

Specifically, as shown in FIG. 1, the substation frame 100 may comprise four supporting posts 111, i.e., the first side supporting post 1121, the second side supporting post 1122, and two intermediate supporting posts 115 as described above. The first side supporting post 1121 is provided with three wire attaching points, the second side supporting post 1122 is provided with two wire attaching points, and each intermediate supporting post 115 is provided with two wire attaching points. The beam 121 as described above is provided between every two adjacent supporting posts 111. A position on the beam 121 between two adjacent supporting posts 111 is provided with one wire attaching point.

In a specific embodiment, the substation frame 100 is a five-circuit structure with a total of fifteen wire attaching points.

Specifically, as shown in FIGS. 1 and 7, the substation frame 100 may comprise four supporting posts 111, i.e., the first side supporting post 1121, the second side supporting post 1122, and two intermediate supporting posts 115 as described above. The first side supporting post 1121 is provided with three wire attaching points, the second side supporting post 1122 is provided with two wire attaching points, and the intermediate supporting post 115 is provided with two wire attaching points. The beam 121 and the second beam 160 as described above are provided between every two adjacent supporting posts 111. A position on the beam 121 between two adjacent supporting posts 111 is provided with one wire attaching point. The second beam 160 is provided with one wire attaching point by providing the third tension insulator 152.

In a specific embodiment, the substation frame 100 is an eight-circuit structure with a total of twenty-four wire attaching points.

Specifically, the eight-circuit structure may include two groups of four-circuit structures disposed side by side.

Alternatively, the substation frame 100 of the eight-circuit structure may comprise eight supporting posts 111, i.e., the first side supporting post 1121, the second side supporting post 1122, and six intermediate supporting posts 115 as described above. The first side supporting post 1121 is provided with three wire attaching points, the second side supporting post 1122 is provided with two wire attaching points, and the intermediate supporting post 115 is provided with two wire attaching points. The beam 121 as described above is provided between every two adjacent supporting posts 111. A position on the beam 121 between two adjacent supporting posts 111 is provided with one wire attaching point.

In other embodiments, the substation frames 100 with different number of wires may be provided in other combinations. The supporting posts 111, the beams 121 and the second beams 160 in the present disclosure may be combined according to actual requirements, and the wire attaching points may be provided according to corresponding wire attaching point arrangement.

The foregoing description is merely embodiments of the present disclosure, and is not intended to limit the patentable scope of the present disclosure. Any equivalent structure or equivalent process variants made by using the specification of the present disclosure and the contents of the accompanying drawings, or directly or indirectly applied to other related technical fields, is likewise included within the scope of the patent protection of the present disclosure.

What is claimed is:

1. A substation frame comprising:
   a supporting assembly including at least two supporting posts arranged at intervals, the at least two supporting posts including one side supporting post at each end;
   a beam assembly including a beam provided between every two adjacent supporting posts; and
   a side wire attaching assembly provided on at least one side supporting post and positioned on a side of the side supporting post facing away from the beam;
   wherein the beam is made of composite insulating material, and a position on the beam between the two supporting posts is capable of being directly configured as a wire attaching point; and
   wherein at least one of the supporting posts includes a first supporting part and a second supporting part that are connected to each other, the first supporting part is located between the beam and the second supporting part, the first supporting part is made of composite insulating material, the second supporting part is made of metal material, and a connection between the first supporting part and the beam assembly is capable of being directly configured as a wire attaching point.

2. The substation frame according to claim 1, wherein the side wire attaching assembly includes a post cross arm, one end of the post cross arm is connected to the side supporting post, and the post cross arm extends out in a direction facing away from the beam; and an other end of the post cross arm is configured to attach a wire.

3. The substation frame according to claim 2, wherein the side wire attaching assembly includes a suspension member having one end connected to the side supporting post and an other end connected to the other end of the post cross arm.

4. The substation frame according to claim 3, wherein both the post cross arm and the suspension member are made of insulating materials, and the wire is capable of being directly attached to the other end of the post cross arm.

5. The substation frame according to claim 2, wherein the side wire attaching assembly includes a first tension insulator connected to the other end of the post cross arm, and the wire is attached to the side wire attaching assembly through the first tension insulator.

6. The substation frame according to claim 1, wherein two supporting posts are provided, one of the supporting posts is provided with three wire attaching points, the other of the supporting posts is provided with two wire attaching points, and the beam is provided with one wire attaching point.

7. The substation frame according to claim 1, further comprising:
   a first supporting insulator connected to the supporting post, wherein a free end of the first supporting insulator is configured for supporting a wire attached to the wire attaching point at the connection between the first supporting part and the beam.

8. The substation frame according to claim 1, wherein the first supporting part is capable of being directly provided with wire attaching points, and a distance between two adjacent wire attaching points is greater than a first predetermined value; or, the substation frame further includes
   a second tension insulator provided on the supporting post, wherein a free end of the second tension insulator is configured as a wire attaching point.

9. The substation frame according to claim 1, further comprising:
a second beam provided between two adjacent supporting posts, and located below the beam; and
a third tension insulator connected to the second beam, wherein a free end of the third tension insulator is configured as a wire attaching point.

10. The substation frame according to claim 1, wherein one of the side supporting posts is made of metal material, and a lightning rod is provided at a top of the side supporting post made of metal material; or
the at least two supporting posts include an intermediate supporting post that is made of metal material, and a lightning rod is provided at a top of the intermediate supporting post made of metal material.

11. The substation frame according to claim 10, wherein the side supporting post made of metal material is provided with a fourth tension insulator, and a free end of the fourth tension insulator is capable of being configured as a wire attaching point.

12. The substation frame according to claim 11, wherein the substation frame includes a second supporting insulator provided on the beam assembly, and one end of the second supporting insulator away from the beam assembly is configured to provide a ground wire, and the ground wire is connected to the lightning rod for grounding.

13. The substation frame according to claim 10, wherein the substation frame includes a second supporting insulator provided on the beam assembly, and one end of the second supporting insulator away from the beam assembly is configured to provide a ground wire, and the ground wire is connected to the lightning rod for grounding.

14. The substation frame according to claim 1, wherein all the supporting posts include a first supporting part and a second supporting part that are connected to each other, the first supporting part is located between the beam and the second supporting part, the first supporting part is made of composite insulating material, the second supporting part is made of metal material, and the substation frame further includes
a lightning rod provided on the beam assembly, the lightning rod being connected to the second supporting part via a jumper to be grounded.

15. The substation frame according to claim 14, wherein the substation frame includes a second supporting insulator provided on the beam assembly, and one end of the second supporting insulator away from the beam assembly is configured to provide a ground wire, and the ground wire is connected to the lightning rod for grounding.

16. The substation frame according to claim 1, wherein all the supporting posts include a first supporting part and a second supporting part that are connected to each other, the first supporting part is located between the beam and the second supporting part, the first supporting part is made of composite insulating material, the second supporting part is made of metal material, the substation frame includes a third supporting insulator provided on the beam assembly, and one end of the third supporting insulator away from the beam assembly is configured to provide a ground wire; the ground wire is directly grounded through a down lead or is connected to the second supporting part through the down lead and thus is grounded.

17. The substation frame of claim 1, wherein both sides of the substation frame are divided into a first side and a second side along a plane where an axis of the beam assembly and an axis of the supporting assembly are located; a wire is led from the first side into a corresponding ground equipment through the substation frame, and the wire corresponds to a set of ground equipment, and the ground equipment is provided below the substation frame or on the ground around the substation frame.

18. The substation frame according to claim 1, further comprising:
a first supporting insulator including a first end connected to the supporting post and a second end opposite to the first end, and the second end being a free end; and
a second tension insulator having a first end disposed on the supporting post and a second end that is a free end, wherein the free end of the second tension insulator is configured as a wire attaching point.

19. A substation frame comprising:
a supporting assembly including at least two supporting posts arranged at intervals, the at least two supporting posts including one side supporting post at each end;
a beam assembly including a beam provided between every two adjacent supporting posts; and
a side wire attaching assembly provided on at least one side supporting post and positioned on a side of the side supporting post facing away from the beam;
wherein the side wire attaching assembly includes a post cross arm, one end of the post cross arm is connected to the side supporting post, and the post cross arm extends out in a direction facing away from the beam; and an other end of the post cross arm is configured to attach a wire.

20. A substation frame comprising:
a supporting assembly including at least two supporting posts arranged at intervals, the at least two supporting posts including one side supporting post at each end;
a beam assembly including a beam provided between every two adjacent supporting posts; and
a side wire attaching assembly provided on at least one side supporting post and positioned on a side of the side supporting post facing away from the beam;
wherein two supporting posts are provided, one of the supporting posts is provided with three wire attaching points, the other of the supporting posts is provided with two wire attaching points, and the beam is provided with one wire attaching point.

* * * * *